US011930341B2

(12) United States Patent
Shao

(10) Patent No.: US 11,930,341 B2
(45) Date of Patent: Mar. 12, 2024

(54) COAXIAL SPEAKER

(71) Applicant: AAC Microtech (Changzhou) Co., Ltd., Changzhou (CN)

(72) Inventor: Tao Shao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 121 days.

(21) Appl. No.: 17/839,501

(22) Filed: Jun. 14, 2022

(65) Prior Publication Data

US 2023/0269538 A1 Aug. 24, 2023

(30) Foreign Application Priority Data

Jan. 25, 2022 (CN) ......................... 202220208773.9

(51) Int. Cl.

*H04R 9/02* (2006.01)
*H04R 9/06* (2006.01)
*H04R 1/02* (2006.01)
*H04R 9/04* (2006.01)
*H04R 7/16* (2006.01)

(52) U.S. Cl.

CPC ............... *H04R 9/025* (2013.01); *H04R 1/02* (2013.01); *H04R 7/16* (2013.01); *H04R 9/045* (2013.01); *H04R 9/06* (2013.01); *H04R 2400/11* (2013.01)

(58) Field of Classification Search

CPC .......... H04R 1/02; H04R 1/10; H04R 1/1058; H04R 1/1075; H04R 1/24; H04R 9/02; H04R 9/025; H04R 9/04; H04R 9/045; H04R 9/06; H04R 9/063; H04R 7/12;

(Continued)

(56) References Cited

U.S. PATENT DOCUMENTS 7,519,191 B2 * 4/2009 Enomoto ............... H04R 9/045
381/186
2009/0136065 A1 * 5/2009 Yano ........................ H04R 9/10
381/186

(Continued)

FOREIGN PATENT DOCUMENTS

CN 208874732 U * 5/2019 ............... H04R 9/06
CN 211531297 U * 9/2020 ............... H04R 9/02
CN 111405422 B * 11/2021 ............... H04R 9/02

OTHER PUBLICATIONS

English Translation of CN-208874732-U. Date May 17, 2019.*

*Primary Examiner* — Thang V Tran
(74) *Attorney, Agent, or Firm* — W&G Law Group

(57) ABSTRACT

The present invention provides a coaxial speaker, including a frame, a magnetic circuit system, and coaxially arranged first sounding unit and second sounding unit. The magnetic circuit system includes a magnetic bowl and a magnet part. The magnet part includes a first magnet part and a second magnet part, and the first magnet part is arranged with a first channel. The second magnet part is arranged with a second channel. The support component encloses the third channel connected to the through hole of the first diaphragm, and the first channel, the second channel and the third channel are connected to form the sound channel of the second sounding unit. The sound from the second sounding unit is emitted from the through hole of the first diaphragm through the sound channel. The coaxial speaker of the present invention has a good treble effect.

7 Claims, 5 Drawing Sheets

(58) Field of Classification Search
CPC .......... H04R 7/16; H04R 11/02; H04R 19/02; H04R 2201/02; H04R 2400/00; H04R 2400/11
See application file for complete search history.

(56) References Cited

U.S. PATENT DOCUMENTS

| | | | | |
|---|---|---|---|---|
| 2011/0044491 | A1* | 2/2011 | Ku | H04R 9/06<br>381/433 |
| 2022/0174414 | A1* | 6/2022 | Yan | H04R 9/025 |
| 2022/0210571 | A1* | 6/2022 | Zhou | H04R 7/18 |

* cited by examiner

A-A

COAXIAL SPEAKER

FIELD OF THE PRESENT DISCLOSURE

The invention relates to the technical field of electro-acoustic transducers, in particular to coaxial speaker.

DESCRIPTION OF RELATED ART

The car speaker is an important part of the car entertainment system, providing functions such as music playback and voice interaction. The car speaker is usually installed in the car door, and the installation space in the car door is limited, which greatly limits the size of the car speaker, which will cause the problem of insufficient treble effect of the car speaker.

Therefore, it is necessary to provide a new coaxial speaker to solve the above technical problems.

SUMMARY OF THE PRESENT INVENTION

The purpose of the present invention is to provide a coaxial speaker that can improve the high-pitched effect by using its own structure.

Accordingly, the present invention provides a coaxial speaker, comprising: a frame; a magnetic circuit system including a magnetic bowl having a bottom wall and a side wall extending from the bottom wall, and a magnet part arranged in the magnetic bowl, the magnet part having a first magnet part arranged on the bottom wall and a second magnet part arranged on the first magnet part; a coaxially arranged first sounding unit and a second sounding unit; a first magnetic gap formed between the magnet part and the side wall; and a first through hole formed in the bottom wall.

The first magnet part includes: a first ring magnet disposed on the bottom wall and surrounding the first through hole; and a magnetic yoke disposed on the first ring magnet.

The magnetic yoke includes: a ring sheet disposed between the first ring magnet and the second magnet part; and an extension wall extending from an inner peripheral edge of the ring sheet. The extension wall extends from inside of the first ring magnet to the first through hole; the extension wall, the bottom wall and the first ring magnet cooperatively forms a second magnetic gap; the extension wall forms the first channel; the second magnet part includes a second channel.

The first sounding unit includes: a first diaphragm fixed to the frame; a first voice coil assembly accommodated in the first magnetic gap for driving the first diaphragm; and a support component fixed to the second magnet part for supporting the first diaphragm. A second through hole is formed by the first diaphragm. The support component encloses a third channel that is connected with the second through hole.

The second sounding unit includes a second diaphragm fixed to the bottom wall and covering the first through hole, and a second voice coil assembly accommodated in the second magnetic gap and driving the second diaphragm to vibrate.

The first channel, the second channel and the third channel are connected to form the sound channel of the second sounding unit; the sound emitted by the second sounding unit is emitted from the second through hole through the sound channel with a horn structure.

Further, the second magnet part includes a second ring magnet arranged on the ring sheet and an annular core arranged on the second ring magnet; the second ring magnet and the annular core enclose the second channel; magnetic poles of the same polarity of the first ring magnet and the second ring magnet are disposed opposite to each other.

Further, the extension wall includes a first wall extending obliquely from the inner peripheral edge of the ring sheet in a direction close to the bottom wall and gradually away from the inner ring surface of the first ring magnet, and a second wall extends from the last end of the first wall into the first through hole along the vibration direction of the second diaphragm.

Further, the support component includes a first fixed part fixed to the first diaphragm, a second fixed part fixed to the second magnet part, and a connection wall connecting the first fixed part and the second fixed part; the connection wall is inclined, and the inclination angle of the connection wall is the same as the inclination angle of the first wall.

Further, the first diaphragm includes an outer suspension fixed to the frame, an inner suspension fixed to the support component, a dome connecting the outer suspension and the inner suspension; the inner suspension is provided with the second through hole.

Further, the frame includes a frame wall, an annular wall spaced apart from the frame wall, and a connection beam connecting the frame wall and the annular wall; the annular wall surrounds the magnetic bowl.

Further, the side wall is provided with a narrow gap, and the first sounding unit further includes an elastic component supporting the first voice coil assembly; the elastic component includes an inner ring part disposed in the first magnetic gap and fixedly connected to the first voice coil assembly and a plurality of elastic arms extending from the inner ring part to the outside of the magnetic bowl; the elastic arm runs through the narrow gap and is fixed to the connection beam.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
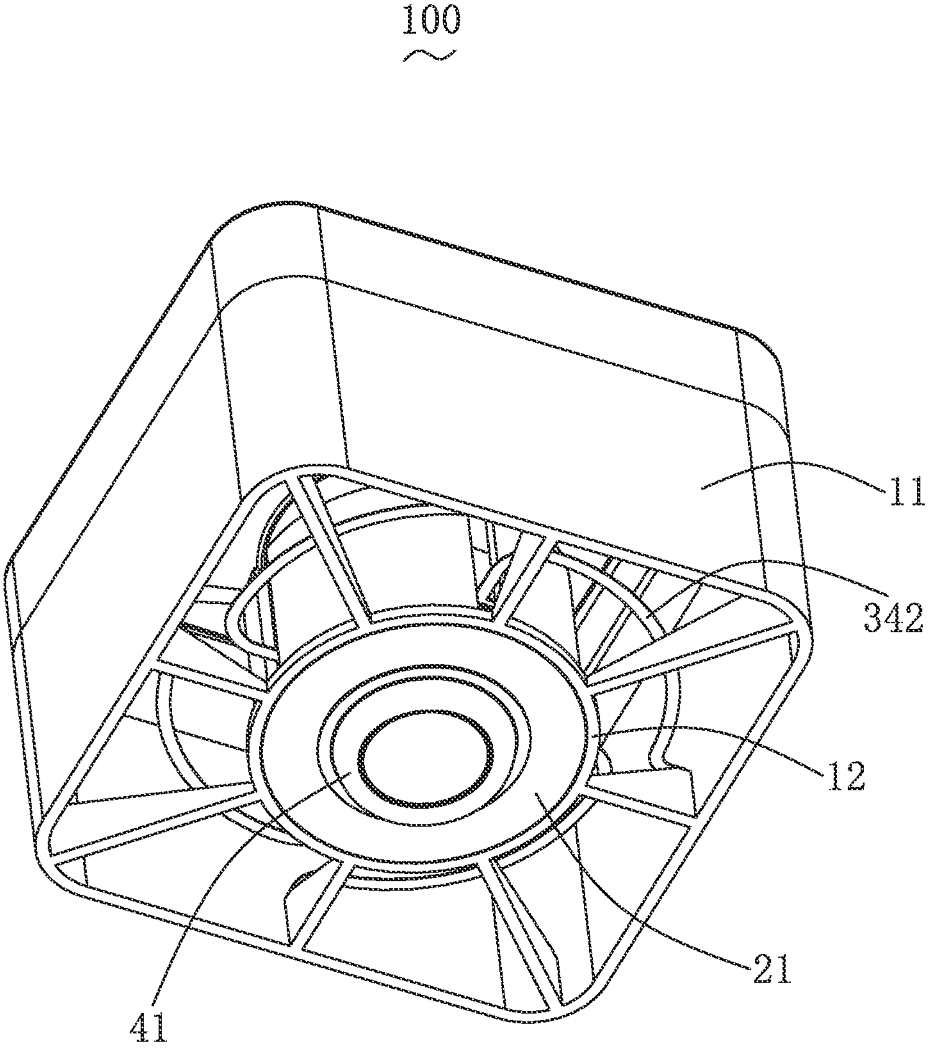
FIG. 1 is an isometric view of a coaxial speaker of an embodiment of the present invention.
Figure 2:
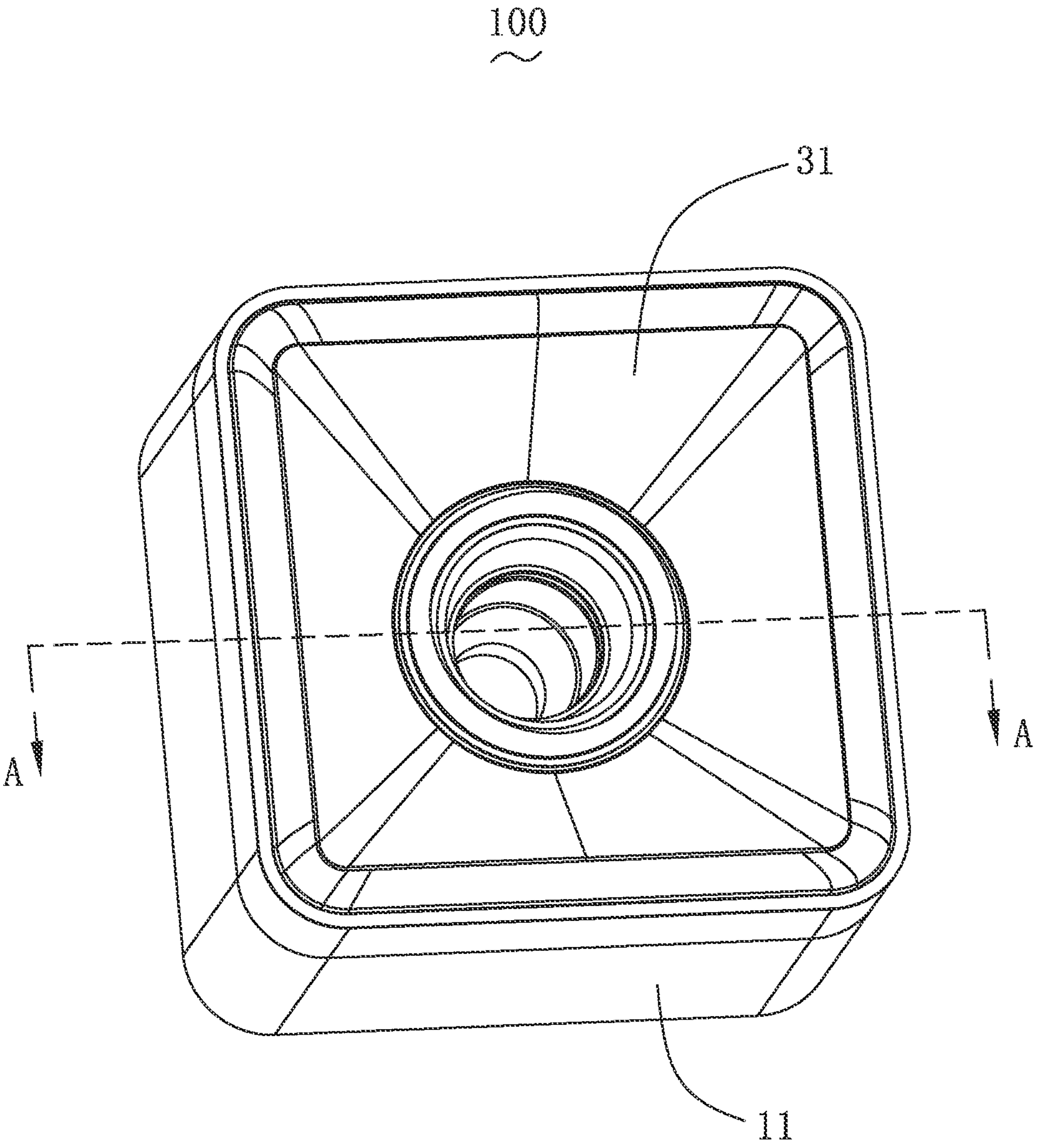
FIG. 2 is an isometric view from another perspective of the coaxial speaker.
Figure 3:
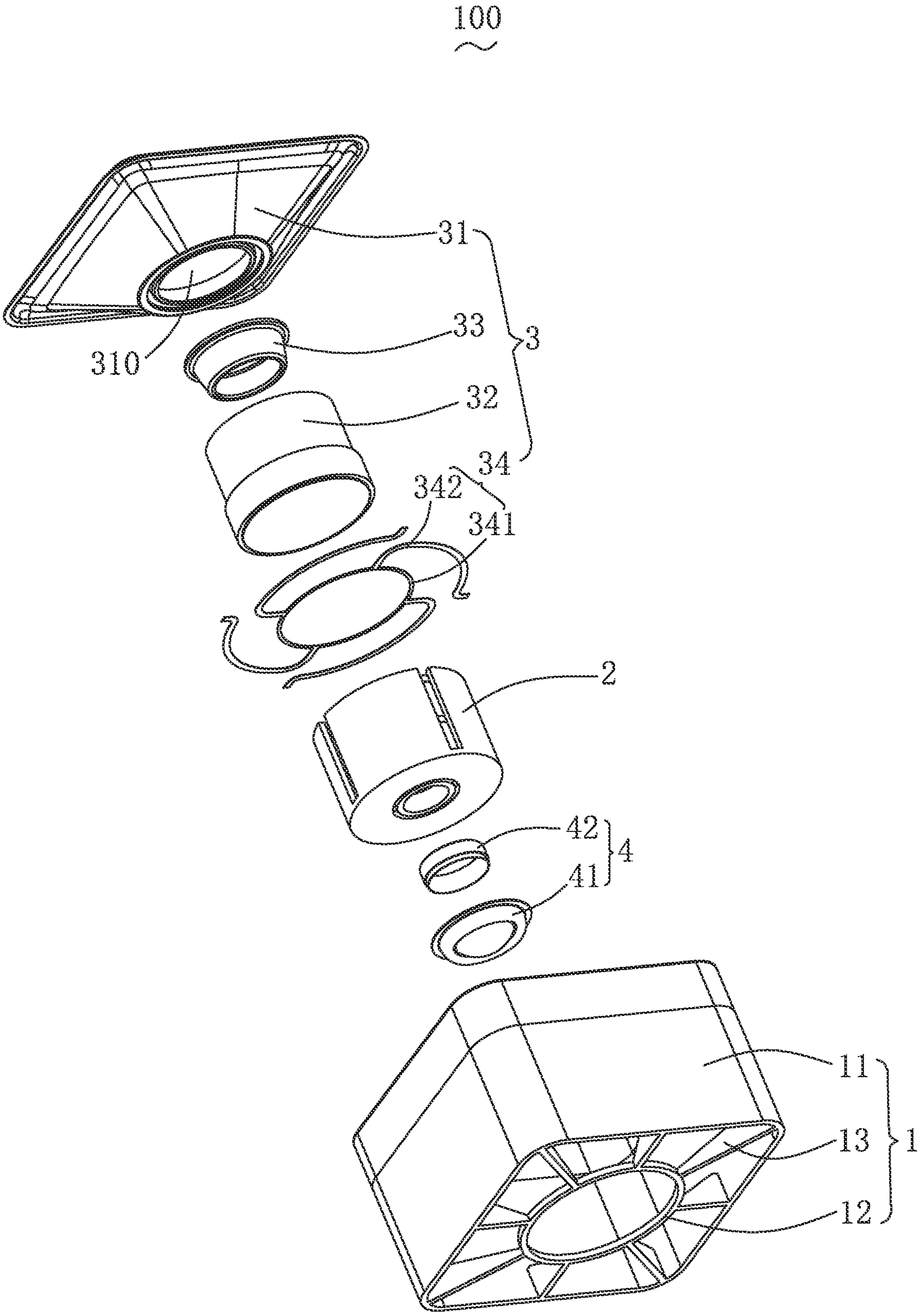
FIG. 3 is an isometric and partially exploded view of the coaxial speaker.
Figure 4:
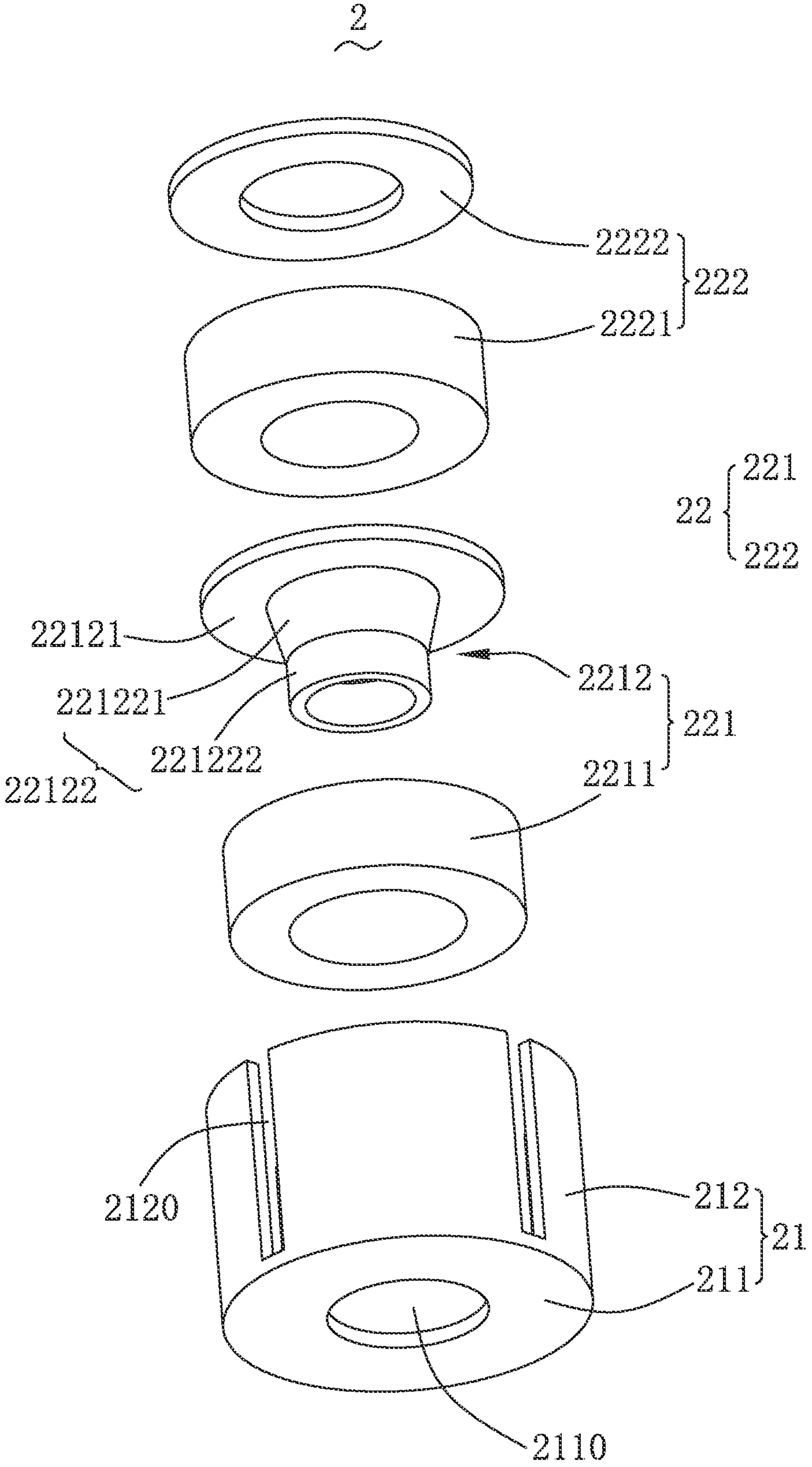
FIG. 4 is an exploded view of a magnetic circuit system of the coaxial speaker.
Figure 5:
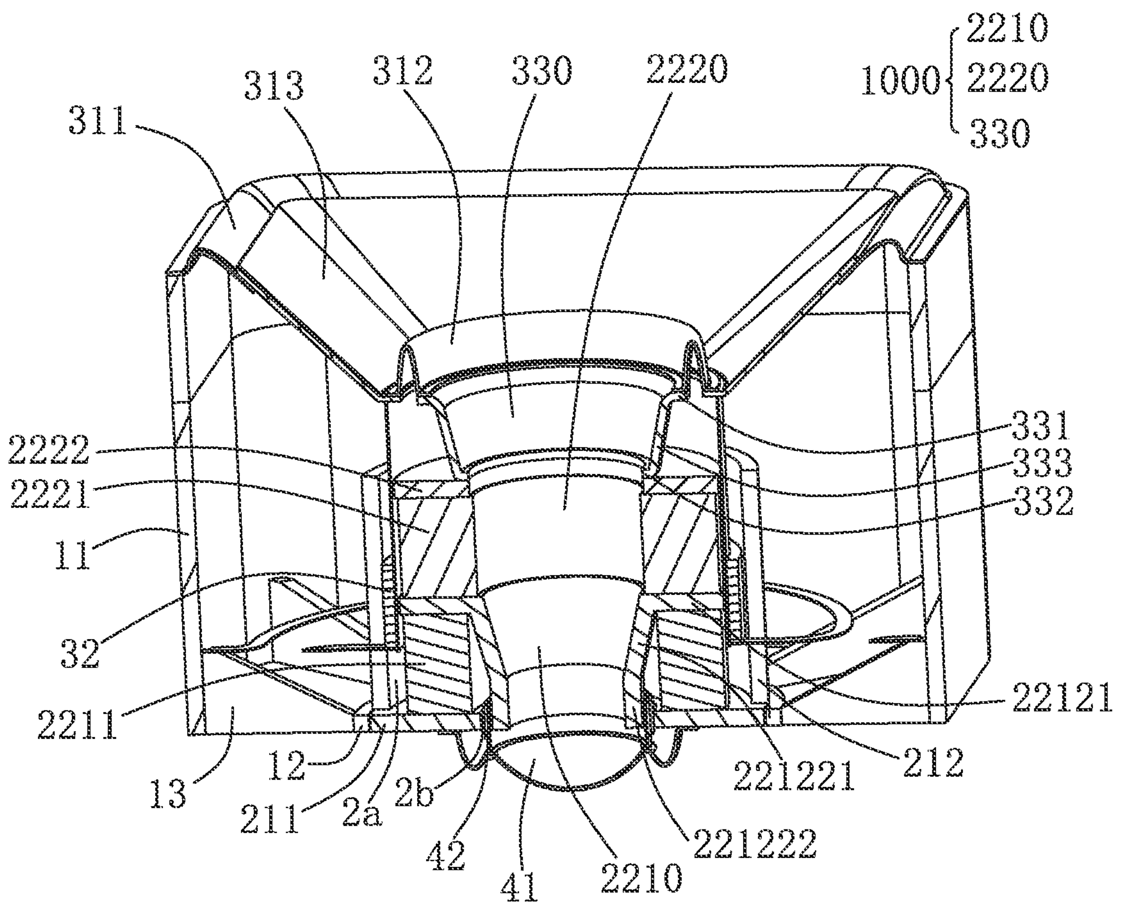
FIG. 5 is a cross-sectional view of the coaxial speaker taken along line AA in FIG. 2.

Please refer to FIGS. 1-5. the present invention provides a coaxial speaker 100. The coaxial speaker 100 includes a frame 1, a magnetic circuit system 2, and a first sounding unit 3 and a second sounding unit 4 coaxially arranged.

The magnetic circuit system 2 includes a magnetic bowl 21 fixed to the frame 1 and a magnet part 22 arranged in the magnetic bowl 21. The magnetic bowl 21 includes a bottom wall 211 and a side wall 212 extending from the bottom wall 211. A first magnetic gap 2*a* is formed between the magnet part 22 and the side wall 212. The bottom wall 211 is provided with a first through hole 2110. The magnet part 22 includes a first magnet part 221 arranged on the bottom wall 211 and a second magnet part 222 arranged on the first magnet part 221. The first magnet part 221 includes a first ring magnet 2211 disposed on the bottom wall 211 and surrounding the first through hole 2110 and a magnetic yoke 2212 disposed on the first ring magnet 2211. The magnetic yoke 2212 includes a ring sheet 22121 disposed between the first ring magnet 2211 and the second magnet part 222 and an extension wall 22122 extending from the inner peripheral edge of the ring sheet 22121. the inside of the first ring magnet 2211 to the first through hole 2110.

A second magnetic gap 2*b* is formed between the extension wall 22122, the bottom wall 211 and the first ring magnet 2211. The extension wall 22122 forms a first channel 2210, and the second magnet part 222 is arranged with a second channel 2220. As a preferred embodiment, the second magnet part 222 includes a second ring magnet 2221 disposed on the ring sheet 22121 and an annular core 2222 disposed on the second ring magnet 2221. The second ring magnet 2221 and the annular core 2222 enclose the second channel 2220. Magnetic poles of the same polarity of the first ring magnet 2211 and the second ring magnet 2221 are disposed opposite to each other. Thus, the magnetic field lines of the magnetic circuit system 2 can form a self-closing cycle, thereby exerting higher magnetic efficiency.

The first sounding unit 3 includes a first diaphragm 31 fixed to the frame 1, a first voice coil assembly 32 that is accommodated in the first magnetic gap 2*a* and drives the first diaphragm 31 to vibrate, and a support component 33 fixed to the second magnet part 222 and supporting the first diaphragm 31. The first diaphragm 31 is provided with a second through hole 310. The support component 33 encloses a third channel 330 that is connected with the second through hole 310. As a preferred embodiment, the first diaphragm 31 includes an outer suspension 311 fixed to the frame 1, an inner suspension 312 fixed to the support component 33, and a dome 313 connecting the outer suspension 311 and the inner suspension 312. The inner suspension 312 is provided with the second through hole 310. The first sounding unit 3 may be a full-frequency sounding unit.

The second sounding unit 4 includes a second diaphragm 41 fixed to the bottom wall 211 and covering the first through hole 2110, and a second voice coil assembly 42 accommodated in the second magnetic gap 2*b* and driving the second diaphragm 41 to vibrate. The second sounding unit 4 may be a high frequency sounding unit. The first channel 2210, the second channel 2220 and the third channel 330 are connected to form the sound channel 1000 of the second sounding unit 4. The sound emitted by the second sounding unit 4 is emitted from the second through hole 310 through the sound channel 1000. Wherein, the sound channel 1000 is set to a horn structure.

The extension wall 22122 includes a first wall 221221 extending obliquely from the inner peripheral edge of the ring sheet 22121 in a direction close to the bottom wall 211 and gradually away from the inner ring surface of the first ring magnet 2211, a second wall 221222 extending from the last end of the first wall 221221 into the first through hole 2110 along the vibration direction of the second diaphragm 41.

The support component 33 includes a first fixed part 331 fixed with the first diaphragm 31, a second fixed part 332 fixed with the second magnet part 222, and a connection wall 333 connecting the first fixed part 331 and the second fixed part 332. The connection wall 333 is disposed obliquely, and the inclination angle of the connection wall 333 is the same as that of the first wall 221221.

The frame 1 includes a frame wall 11, an annular wall 12 spaced from the frame wall 11, and a connection beam 13 connecting the frame wall 11 and the annular wall 12. The annular wall 12 surrounds the magnetic bowl 21. The side wall 212 is provided with a narrow gap 2120. The first sounding unit 3 further includes an elastic component 34 supporting the first voice coil assembly 32. The elastic component 34 includes an inner ring part 341 disposed in the first magnetic gap 2*a* and fixed to the first voice coil assembly 32 and a plurality of elastic arms 342 extending from the inner ring part 341 to the outside of the magnetic bowl 21. The elastic arm 342 runs through the narrow gap 2120 and is fixed to the connection beam 13.

For a present invention coaxial speaker, the first magnet part is arranged with a first channel, and the second magnet part is arranged with a second channel. The first sounding unit includes a first diaphragm provided with a through hole and a support component fixed to the second magnet part and supporting the first diaphragm. The support component encloses a third channel that is connected with the through hole of the first diaphragm, a first channel, the second channel and the third channel are connected to form the sound channel of the second sounding unit. The sound emitted by the second sounding unit is emitted from the through hole of the first diaphragm through the sound channel. The sound channel is set to a horn structure. The sound channel derives the sound emitted by the second sounding unit to sound on the same side as the first sounding unit. At the same time, the sound channel of the horn structure can further enhance the treble effect of the coaxial speaker.

It should be noted here that the coaxial speaker of the present invention is not limited to in-vehicle applications, but can be applied to any device with a sound-emitting function.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a frame;

a magnetic circuit system including a magnetic bowl having a bottom wall and a side wall extending from the bottom wall, and a magnet part arranged in the magnetic bowl, the magnet part having a first magnet part arranged on the bottom wall and a second magnet part arranged on the first magnet part;

a coaxially arranged first sounding unit and a second sounding unit;

a first magnetic gap formed between the magnet part and the side wall;

a first through hole formed in the bottom wall; wherein the first magnet part includes:

a first ring magnet disposed on the bottom wall and surrounding the first through hole;

a magnetic yoke disposed on the first ring magnet; the magnetic yoke includes:

a ring sheet disposed between the first ring magnet and the second magnet part;

an extension wall extending from an inner peripheral edge of the ring sheet; and wherein the extension wall extends from inside of the first ring magnet to the first through hole; the extension wall, the bottom wall and the first ring magnet cooperatively forms a second magnetic gap; the extension wall forms a first channel; the second magnet part includes a second channel;

the first sounding unit includes:

a first diaphragm fixed to the frame;

a first voice coil assembly accommodated in the first magnetic gap for driving the first diaphragm; and a support component fixed to the second magnet part for supporting the first diaphragm;

a second through hole is formed by the first diaphragm; the support component encloses a third channel that is connected with the second through hole; and wherein the second sounding unit includes a second diaphragm fixed to the bottom wall and covering the first through hole, and a second voice coil assembly accommodated in the second magnetic gap and driving the second diaphragm to vibrate;

the first channel, the second channel and the third channel are connected to form the sound channel of the second sounding unit; the sound emitted by the second sounding unit is emitted from the second through hole through the sound channel with a horn structure.

2. The coaxial speaker as described in claim 1, wherein the second magnet part includes a second ring magnet arranged on the ring sheet and an annular core arranged on the second ring magnet; the second ring magnet and the annular core enclose the second channel; magnetic poles of the same polarity of the first ring magnet and the second ring magnet are disposed opposite to each other.

3. The coaxial speaker as described in claim 1, wherein the extension wall includes a first wall extending obliquely from the inner peripheral edge of the ring sheet in a direction close to the bottom wall and gradually away from the inner ring surface of the first ring magnet, and a second wall extends from the last end of the first wall into the first through hole along the vibration direction of the second diaphragm.

4. The coaxial speaker as described in 3, wherein the support component includes a first fixed part fixed to the first diaphragm, a second fixed part fixed to the second magnet part, and a connection wall connecting the first fixed part and the second fixed part; the connection wall is inclined, and the inclination angle of the connection wall is the same as the inclination angle of the first wall.

5. The coaxial speaker as described in 1, wherein the first diaphragm includes an outer suspension fixed to the frame, an inner suspension fixed to the support component, a dome connecting the outer suspension and the inner suspension; the inner suspension is provided with the second through hole.

6. The coaxial speaker as described in claim 1, wherein the frame includes a frame wall, an annular wall spaced apart from the frame wall, and a connection beam connecting the frame wall and the annular wall; the annular wall surrounds the magnetic bowl.

7. The coaxial speaker as described in 6, wherein the side wall is provided with a narrow gap, and the first sounding unit further includes an elastic component supporting the first voice coil assembly; the elastic component includes an inner ring part disposed in the first magnetic gap and fixedly connected to the first voice coil assembly and a plurality of elastic arms extending from the inner ring part to the outside of the magnetic bowl; the elastic arm runs through the narrow gap and is fixed to the connection beam.

* * * * *